Patented July 2, 1946

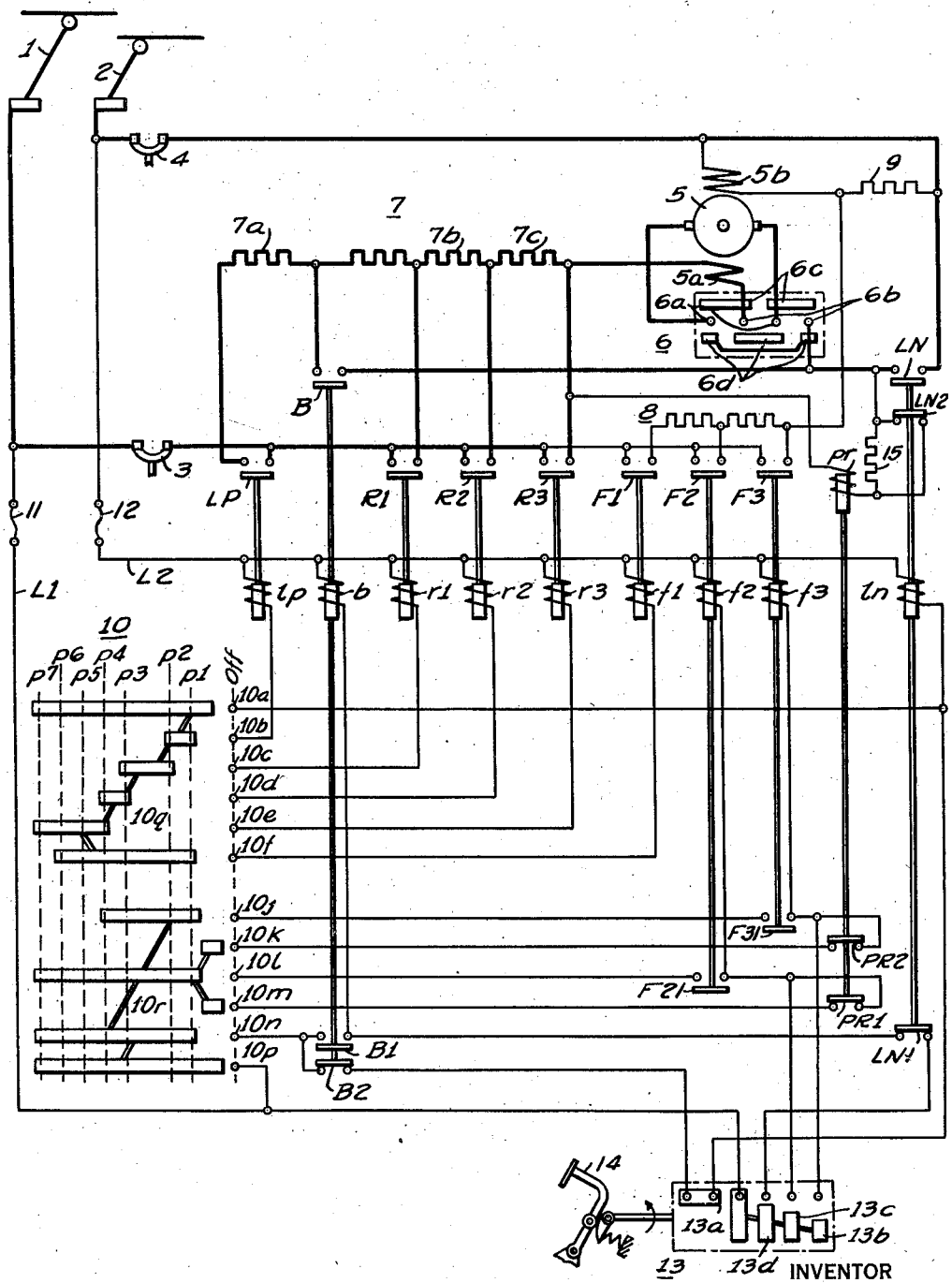

2,403,048

UNITED STATES PATENT OFFICE 2,403,048

ELECTRIC MOTOR CONTROL SYSTEM

Charles James Caldbeck, Bradford, England, assignor to The English Electric Company Limited, London, England, a British company Application December 11, 1943, Serial No. 513,877
In Great Britain November 27, 1942

6 Claims. (Cl. 172—179)

Shunt or compound wound electric motors can afford a high starting torque with a considerable speed range by being started with the shunt field winding acting at full strength, this winding being subsequently weakened to afford higher speeds and, in the case of a compound wound motor, the shunt field may eventually be disconnected. By progressively increasing the strength of the shunt field moreover, such a motor can be regeneratively braked, returning power to the supply system. An ordinary series wound motor on the other hand cannot readily be regeneratively braked without some special provision and the more usual method of braking such a motor is to connect a braking rheostat in parallel with its armature, but in any case a purely series wound motor cannot be braked while excited by its series field winding unless the relative connections of the armature and field winding be first reversed. For such reasons and because the advantages for traction purposes of the characteristic of a series motor can to a large extent be retained, compound motors nowadays are much in favour for electric traction.

Where electric traction or other shunt or compound wound motors are supplied from a supply system of comparatively small load capacity and on which the load of these motors forms a substantial proportion of the total load, regeneration may be highly disadvantageous or even inadmissible.

For the purpose of retaining some of the advantages of a compound wound motor the present invention consists broadly in the combination therewith of control means for accelerating the motor and including weakening or possible ultimate disconnection of the shunt field and means for preventing, on return movement of the controller, any strengthening of the shunt field or at least any strengthening sufficient to bring about appreciable regeneration. A further feature of the invention consists in provision for rheostatically braking the motor and furthermore also for progressively increasing the strength of the shunt field during such braking.

One particular form of electric traction equipment according to the invention is shown in diagrammatic form in the single figure of the accompanying drawing.

Referring to the drawing, the traction motor circuits extend from the positive trolley 1 to the negative trolley 2 through the main circuit breakers 3 and 4. The traction motor consists of the armature 5, the series field 5a and the shunt field 5b. The armature connections can be reversed by the conventional form of reversing switch 6 having a pair of contacts 6a connected to the rest of the circuit, a pair of contacts 6b connected to the armature, bridging contacts 6c which can establish certain connections between contacts 6a and 6b for one direction of rotation of the motor and bridging contacts 6d which can establish reverse connections for reverse rotation.

The motor armature circuit can be traced from the circuit breaker 3 through the positive main line contactor LP, the starting resistance 7 divided into sections 7a, 7b and 7c, the series field winding 5a, the reversing switch 6, the armature 5 and the negative main line contactor LN to the circuit breaker 4. Resistance contactors R1, R2 and R3 are provided for progressively short-circuiting sections 7a, 7b and 7c of resistance 7. The shunt field circuit can be traced from the circuit breaker 3 through the shunt field contactor F1, the shunt field resistance 8 and the shunt field winding 5b to the circuit breaker 4. Further shunt field contactors F2 and F3 are provided which can open to increase progressively the resistance in the circuit of the shunt field winding 5b. A protective discharge resistance 9 is connected in parallel with the shunt field winding 5b. There is also provided a braking contactor B which, when closed, connects the contactor LN to a point on resistance 7, thereby connecting in parallel with the armature 5 some part of the starting resistance to serve as a rheostatic braking resistance.

The control circuits through the driver's controller 10 and the contactor coils extend from the trolley 1 through the fuse 11 and the line L1 to the line L2 and the fuse 12 and thence to the trolley 2.

The driver's controller 10 of the drum type comprises a number of stationary contact fingers 10a—10p and conducting drum segments in two groups 10q and 10r which can bridge these fingers. The operating coils for the contactors LN, LP, R1, etc., are indicated by ln, lp, r1, etc. and are connected to the various stationary contacts of the controller 10.

Line L1 is connected to contact 10p. Contact 10n is connected through normally closed auxiliary contact B2 on the rheostatic braking contactor B and through the upper normally closed contacts 13a of the driver's brake switch 13, described later, to the stationary contact 10a. The negative line contactor coil ln is connected between contact 10a and the negative line L2. The positive line contactor coil lp is connected between 10b and L2. The resistance contactor coils r1, r2 and r3 are connected between contacts 10c, 10d and 10e respectively and line L2. The shunt field contactor coil f1 is connected between contact 10f and line L2. The shunt field contactor f2 is connected between contact 10m and line L2, but a connection can also be made from contact 10l to coil f2 through normally open holding contacts F21 on shunt field contactor F2. Shunt field contactor coil f3 is connected between contact 10k and line L2 but a connection can be made from contact 10j to coil f3 through normally open holding contact F31 on shunt field contactor F3.

According to the invention there is added auxiliary switching means which prevent operation of certain of the shunt field contactors in response to return movement of the controller 10 from its full speed position.

Provision is also made for the establishment of rheostatic braking by the operation of a multiple brake switch 13 by depression of the driver's brake pedal 14. The line L1 is connected to the normally open switch contacts 13b, 13c and 13d of the brake switch. Closure of contacts 13b connects line L1 to contact 10k and shunt field contactor coil f3. Closure of contacts 13c connects line L1 to contact 10m and to shunt field contactor coil f2. Closure of contacts 13d connects line L1 through the normally closed contacts LN1 on the negative main line contactor LN to the coil b of the braking contactor B which is thereby connected between line L1 and line L2. Normally open holding contacts B1 on the braking contactor B and closed by the energisation of coil b can connect contact 10n to coil b. The connections through contacts 13a of the driver's brake switch 13 have already been described.

According to a further feature of the invention, the connection from contact 10k to shunt field contactor coil f3 is through the normally closed contacts PR1 and the connection from contact 10m to shunt field contactor coil f2 through normally closed contacts PR2 of a further relay having its operating coil pr connected in parallel with the traction motor armature 5 and series field winding 5a in series with a comparatively high resistance 15; this resistance is shunted by the normally closed auxiliary contacts LN2 on the negative main line contactor. This second relay is so designed as to open its contacts PR1 and PR2 when the P. D. across the motor armature has reached a certain value. When the motor armature 5 is disconnected from the supply, the relay coil pr will keep its contacts open until the motor is almost at rest and the voltage across the armature 5 has fallen to a very low value. To assist this effect, the opening of the negative line contactor LN closes the contacts LN2 to short-circuit the high resistance 15 to ensure that the relay will keep its contacts closed with a very low voltage across it. So long as the power supply is connected to the motor armature 5 by closure of main line contactor LN, the resistance 15 will be in series with relay coil pr to protect the latter from the possible application of high voltage.

The operation is as follows:

The initial movement of the controller 10 from its starting position energises the field contactor coils f3 and f2 by establishing circuits from contact 10p by way of drum segment group 10r and contacts 10k and 10m through coils f3 and f2 to line L2. These circuits are interrupted by the disengagement of the drum segments from contacts 10k and 10m when the controller reaches its position indicated by p1 which is the first speed notch. In this first position, however, drum segment group 10r makes maintaining circuits through the contacts 10j and 10l and the maintaining contacts F31 and F21 of the field contactors which accordingly remain energised. Drum segment group 10r also makes a connection through contact 10n to contact 10a whereby negative line contactor coil ln is energised and drum segment group 10q connects together contacts 10a and 10b whereby positive line contactor coil lp is energised. Thus the circuit through the traction motor armature is completed by contactors LP and LN; since field contactor F3 is closed, the traction motor is started at its full shunt field strength. The drum segment group 10q also connects contact 10a to contact 10f whereby contactor coil f1 is energised to close shunt field contactor F1.

On movement of the controller 10 to its second position p2, the drum segment group 10q connects contact 10a to contact 10c, thereby energising contactor coil r1 and closing resistance contactor R1 to short-circuit section 7a of the starting resistance. Movement beyond this position de-energises contactor coil lp which allows contactor LP to open without effect.

On movement of the controller 10 to its third position p3, drum segment group 10q engages contact 10d to energise contactor coil r2, thereby closing contactor R2 and short-circuiting section 7b of the starting resistance.

On movement of the controller to its position p4, drum segment 10q engages contact 10e to energise contactor coil r3 whereby contactor R3 closes to short-circuit the whole of the starting resistance 7. In this position, contactor coil r1 may be de-energised and contactor R1 can open without effect and on movement beyond this position contactor coil r2 may be de-energised and contactor R2 can open without effect. All the starting resistance has now been cut out and the motor is running on full shunt field strength.

By now the relay coil pr will have opened the contacts PR1 and PR2 in the circuits—already opened—of contacts 10m and 10k.

On movement of the controller to position p5, contactor coil f3 is de-energised whereby shunt field contactor f3 opens to weaken the shunt field 5b. On movement of the controller to position p6, contactor coil f2 is de-energised whereby shunt field contactor F2 opens to insert the whole of resistance 8 in series with the shunt field 5b. On movement of the controller to its last position p7, contactor coil f1 is de-energised so that contactor F1 opens to disconnect the shunt field 5b.

On return movement of the controller to position p6, the supply is again connected by way of contact 10f to shunt field contactor coil f1 so that contactor F1 closes to re-connect the motor shunt field 5b to the supply, it being assumed that the action of this field is so weak as to produce no appreciable regeneration of the motor. Further return movement of the controller to positions p5 and p4 prepares connections by way of contacts 10l and 10j for the shunt field contactor coils f2 and f3, which connections are however subject to the now open holding contacts F31 and F21. Hence there is no reclosure of these contactors F2 and F3 in the reverse order to that in which they opened and no strengthening of the shunt field to produce regeneration. Further backward movement of the controller, however, operates the resistance contactors R2 and R1 and the positive main line contactor LP in the reverse order to that in which they operated on forward movement of the controller.

It is not until the controller is passing from position p1 to the "off" position (after having de-energized coils *ln* and *lp* and opened contactors LN and LP to disconnect the motor armature 5 from the supply) that the contactor coils *f2* and *f3* are momentarily energised and then de-energised.

It is customary for a driver, when approaching a section break at high speed, to bring his controller 10 to the "off" position and after passing the break to return the controller quickly to its former position. Any such movement would tend to cause the controller to come back to the "off" position with the motor shunt field weakened and then with the motor running at substantially full speed, to cause the motor to be reconnected to the supply with the shunt field at full strength, the field not being weakened until the controller has got back to, or nearly back to, its initial high speed position and this might result in a momentary powerful and perhaps highly objectionable regeneration. The parts of contact segment group 10r which establish the lifting circuits for coils *f1* and *f2* are, however, very short so that it is possible for the driver, by moving his controller rapidly, to ensure that under the said conditions the relay does not have time to lift. Furthermore, the relay *pr* by its contacts PR1 and PR2 prevents the field contactors F2 and F3 from closing should the controller 10 dwell too long in the initial position between the "off" position and position p1.

Rheostatic braking can be obtained when the controller 10 is in the "off" position by movement of the driver's brake pedal 14. On closure of contacts LN1 in response to opening of the negative line contactor LN to disconnect the motor armature 5 from the supply, depression of the pedal and closure of the contacts 13d establishes a circuit from line L1 through contacts 13d, contacts LN1 and contactor coil *b* to line L2 whereby the braking contactor B closes to connect part of the resistance 7 across the motor armature 5. The braking contactor B also closes its contacts B1 to establish a holding circuit for itself from the controller contact 10n. Contacts 13a opened by movement of the brake switch and contacts B2 opened by the braking contactor both interrupt the circuit of main line contactor coils *ln* and *lp*. Thus if the braking contactor is energised with both the braking switch 13 and the controller 10 in an "on" position, a holding circuit is established for coil *b* by way of controller contact 10n and accordingly the brake contactor B cannot be de-energised and a circuit cannot be established for the line contactor coils *ln* and *lp* until both the braking pedal 14 has been released to bring the braking switch 13 back to its off position and the controller 10 has been brought back to its off position. The progressive depression of pedal 14 progressively closes contacts 13c and 13b for progressively energising from line L1, the coils *f2* and *f3* thereby progressively closing the shunt field contactors F2 and F3 so that the shunt field winding 5b is energised and progressively brought up to full strength.

It will be appreciated that an existing equipment according to the invention can be readily modified so that the equipment is made suitable for use where both regenerative and rheostatic braking are desired.

What I claim as my invention and desire to secure by Letters Patent is:

1. Electric traction equipment comprising an electric traction motor having a series field winding and a shunt field winding, a starting resistor for the motor, a manually operable multi-position controller, resistor shunting contactors operable in one sequence in response to progressive forward movement of the controller and in the reverse sequence in response to progressive return movement of the controller and shunt field weakening contactors operable in one sequence in response to progressive forward movement of the controller but not operable in response to the return movement of the controller until it is being moved into its off position.

2. Electric traction equipment comprising an electric traction motor having a series field winding and a shunt field winding, a starting resistor for the motor, a manually operable multi-position controller, resistor shunting contactors operable in one sequence in response to progressive forward movement of the controller and in the reverse sequence in response to progressive return movement of the controller, shunt field weakening contactors operable in one sequence in response to progressive forward movement of the controller but not operable in response to the return movement of the controller until it is being moved into its off position, energizing connections for operating said field contactors to strengthen the motor shunt field, contact members on said controller for momentarily establishing said connections on initial movement of the controller, holding circuits for said contactors, holding contacts in said holding circuits, and contact members on said controller for progressively opening said holding circuits to weaken the motor shunt field.

3. Electric traction equipment comprising an electric traction motor having a series field winding and a shunt field winding, a starting resistor for the motor, a manually operable multi-position controller, resistor shunting contactors operable in one sequence in response to progressive forward movement of the controller and in the reverse sequence in response to progressive return movement of the controller, shunt field weakening contactors operable in one sequence in response to progressive forward movement of the controller but not operable in response to the return movement of the controller until it is being moved into its off position, energizing connections for operating said field contactors to strengthen the motor shunt field, contact members on said controller for momentarily establishing said connections on initial movement of the controller, holding circuits for said contactors, holding contacts in said holding circuits, contact members on said controller for progressively opening said holding circuits to weaken the motor shunt field, a relay responsive to the traction motor armature voltage, said relay having a low drop-out voltage, and contact members on said relay disposed in said energizing connections, said relay contacts being opened when the motor armature voltage is above said drop-out voltage.

4. Electric traction equipment comprising an electric traction motor having a series field winding and a shunt field winding, a starting resistor for the motor, a manually operable multi-position controller, resistor shunting contactors operable in one sequence in response to progressive forward movement of the controller and in the reverse sequence in response to progressive return movement of the controller, shunt field weakening contactors operable in one sequence in response to progressive forward movement of the controller but not operable in response to the return movement of the controller until it is being moved into its off position, a rheostatic braking contactor having an operating coil, and a manually operable brake switch for controlling the energization of said coil, said brake switch being electrically interlocked with said controller.

5. Electric traction equipment comprising an electric traction motor having a series field winding and a shunt field winding, a starting resistor for the motor, a manually operable multi-position controller, resistor shunting contactors operable in one sequence in response to progressive forward movement of the controller and in the reverse sequence in response to progressive return movement of the controller, shunt field weakening contactors operable in one sequence in response to progressive forward movement of the controller but not operable in response to the return movement of the controller until it is being moved into its off position, a rheostatic braking contactor having an operating coil, a manually operable brake switch for controlling the energization of said coil, said brake switch being electrically interlocked with said controller, and contact members on said controller for maintaining a holding circuit for said coil.

6. Electric traction equipment comprising an electric traction motor having a series field winding and a shunt field winding, a starting resistor for the motor, a manually operable multi-position controller, resistor shunting contactors operable in one sequence in response to progressive forward movement of the controller and in the reverse sequence in response to progressive return movement of the controller shunt field weakening contactors operable in one sequence in response to progressive forward movement of the controller but not operable in response to the return movement of the controller until it is being moved into its off position, a rheostatic braking contactor having an operating coil, a manually operable brake switch for controlling the energization of said coil, said brake switch being electrically interlocked with said controller, and sequentially operable contact members on said brake switch for progressively closing said shunt field contactors to strengthen the motor shunt field during rheostatic braking.

CHARLES JAMES CALDBECK.